UNITED STATES PATENT OFFICE.

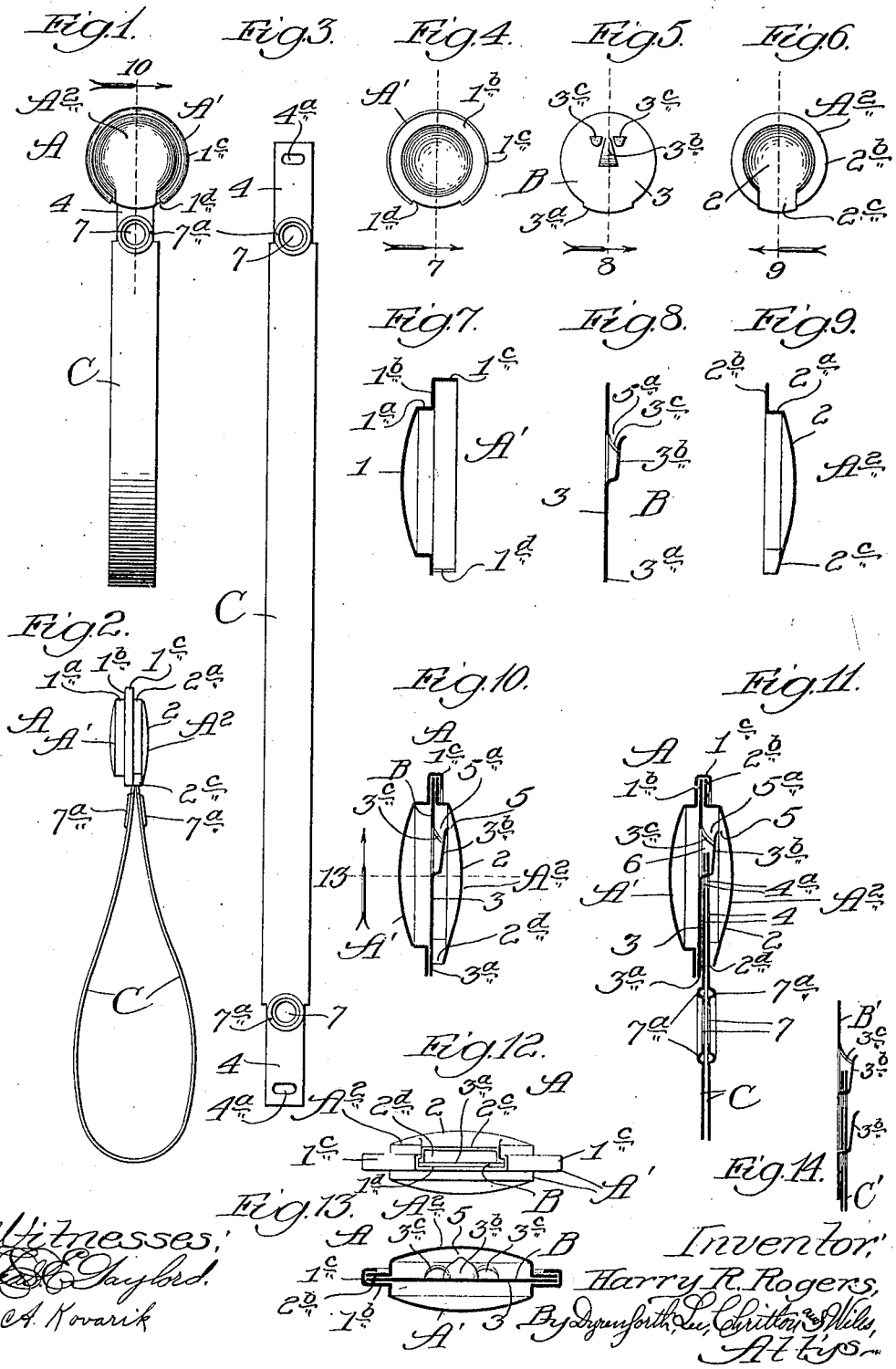

HARRY R. ROGERS, OF CHICAGO, ILLINOIS, ASSIGNOR TO CHICAGO CAR SEAL COMPANY, OF CHICAGO, ILLINOIS, A CORPORATION OF ILLINOIS.

SEAL.

1,298,402.  Specification of Letters Patent.  Patented Mar. 25, 1919.

Application filed July 18, 1918. Serial No. 245,464.

*To all whom it may concern:*

Be it known that I, HARRY R. ROGERS, a citizen of the United States, residing at Chicago, in the county of Cook and State of Illinois, have invented a new and useful Improvement in Seals, of which the following is a specification.

This invention relates particularly to carseals; and the primary object is to provide a self-locking car-seal which can be cheaply manufactured, which is reliable in use, and which is proof against tampering.

The invention is illustrated in its preferred embodiment in the accompanying drawing, in which—

Figure 1 represents a plan view of a carseal embodying my invention, showing both ends of the shackle secured in the casing; Fig. 2, an edge view of the same; Fig. 3, a plan view of the shackle; Fig. 4, an inner view of the main section of the casing; Fig. 5, a plan view of a retainer-plate employed; Fig. 6, an inner view of the other section, or cap, of the casing; Fig. 7, a section taken as indicated at line 7 of Fig. 4; Fig. 8, a section taken as indicated at line 8 of Fig. 5; Fig. 9, a section taken as indicated at line 9 of Fig. 6; Fig. 10, a section of the casing taken as indicated at line 10 of Fig. 1; Fig. 11, a broken sectional view similar to Fig. 10, but showing the ends of the shackle secured in the casing; Fig. 12, a view of the open end of the casing; Fig. 13, a transverse sectional view of the casing and the retainer-plate; and Fig. 14, a broken sectional view of a modification.

In the preferred embodiment, which is illustrated, the device comprises a casing A; a retainer-plate B housed in said casing; and a shackle C, whose ends are adapted to be secured in the casing.

The casing comprises, in the form shown, a circular box-like section $A^1$, and a circular cap-section $A^2$. The section $A^1$ comprises a concave disk 1 provided with a forwardly-extending flange $1^a$, from the forward end of which extends an annular portion or flange $1^b$ which is equipped at its outer edge with a forwardly-projecting flange $1^c$. The flange $1^c$ is cut away at one side to afford an opening $1^d$ for the shackle. The section $A^2$ comprises a concave disk 2 provided at its periphery with a backwardly-extending flange $2^a$, from which extends outwardly an annular portion or flange $2^b$. The metal of the annular portion $2^b$ is pressed outwardly to coincide or coalesce with the metal of the disk 2 at one point, thus forming an embossment $2^c$ and providing an opening $2^d$ which is complemental to the opening produced at the cutaway portion $1^d$ of the member $A^1$. The sections $A^1$ and $A^2$ are preferably formed from tin or sheet-metal by suitable stamping operations.

The retainer-plate B comprises a sheet-metal disk 3 which is provided at one edge with an extension $3^a$ adapted to fit in the recess $1^d$ of the flange $1^c$. The disk 3 is also provided with a central, relatively long resilient shackle-holding prong $3^b$ which has a rearwardly-directed point, and with a pair of short comparatively stiff lugs or embossments $3^c$ which flank the extremity of the impaling prong $3^b$ and serve to prevent disengagement of the shackle from the impaling prong. The prong $3^b$ and the lugs $3^c$ are preferably formed by partially cutting the metal of the disk 3 and striking it upwardly or forwardly, as will be readily understood.

In assembling the casing and retainer-plate, the plate B is placed upon the annular plane portion $1^b$ of the casing-section $A^1$, fitting snugly within the flange $1^c$, the extension or lug $3^a$ of the retainer-plate projecting into or through the recess $1^d$. The cap $A^2$ is then placed in position, with the annular plane portion $2^b$ bearing upon the retainer-disk B and the embossment $2^c$ disposed over the extension $3^a$ of the retainer-plate. The flange $1^c$ of the section $A^1$ is then bent or crimped over the plane portion $2^b$ of the cap-section, thus firmly securing the casing-sections together and clamping the retainer-plate B between them.

Thus assembled, the casing presents an opening through which the ends of the shackle may be inserted. The shackle C comprises a flexible strip of sheet-metal having its extremities provided with reduced extensions 4 and having at the end portions thereof perforations $4^a$ which are adapted to engage the somewhat resilient prong or shackle-hook $3^b$. When the end of the shackle is inserted, it passes through the slight space 5 between the extremity of the hook $3^b$ and the adjacent inclined portion of the outwardly-bowed disk 2, the hook or prong yielding to permit passage. The opening $4^a$ of the shackle then engages the prong $3^b$, and when the shackle is drawn outwardly, the end portion is drawn through the V-shaped entrance 5ª between the extremity of the prong 3ᵇ and the lugs 3ᶜ, the end of the shackle thus becoming secured in the space 6 as shown in Fig. 11. In drawing the shackle forwardly to cause the extremity to enter the space 6 the prong 3ᵇ yields or is pressed outwardly to permit the end of the shackle to be drawn between the yielding prong and the relatively stiff brads or lugs 3ᶜ.

In practice, the casing-sections and the retainer-disk are independently formed and assembled in a suitable machine, which secures the casing-sections together. One end of the shackle is then inserted and caused to permanently engage the yielding prong 3ᵇ. In using the seal for sealing a car, the free end of the shackle may be passed through a perforation in the cotter-pin or bolt which serves to secure the hasp of the car-door and the free end of the shackle is then inserted in the casing and caused to interlockingly engage the prong 3ᵇ. When thus engaged, it is impossible to disengage the shackle from the retainer-disk without destroying the seal. Preferably, the shackle is provided at the junction of the reduced portions 4 and the body of the shackle with perforations 7, for the purpose of weakening the shackle at these points. These portions of the shackle may also be provided with embossments 7ª which tend to obstruct the shackle-receiving opening of the casing. These are known expedients and any suitable feature of this sort may be employed, if desired.

The casing is of suitable dimensions to prevent the possibility of its being deformed and drawn through the opening through which the securing pin of the car-door passes. The casing or housing is of circular contour, but is comparatively flat, so that the device is compact. The spring or hook for engaging the shackle is formed integrally with the retainer-disk, so that no independent spring is required. The construction involves the use of few parts, which are simple, and readily assembled.

The invention provides a strong, reliable and highly effective seal, at small cost.

In the modification shown in Fig. 14 B¹ represents a retainer-disk provided with two alined impaling prongs 3ᵇ; and C¹ represents a shackle having each of its end portions provided with two prong-engaging perforations. In this case, the retainer-disk is secured within the casing as in the first described construction, and the ends of the shackle are inserted and engage the prongs of the retainer. This feature provides somewhat greater security without increasing the cost of manufacture.

The foregoing detailed description has been given for clearness of understanding only, and no unnecessary limitations should be understood therefrom, but the appended claims should be construed as broadly as permissible in view of the prior art.

What I regard as new and desire to secure by Letters Patent is—

1. A seal comprising a dished disk having an annular flange projecting from the dished portion and having a forwardly-projecting flange carried thereby, provided with a cut-away portion affording a shackle-opening, a dished cap-disk having an annular flange projecting from the dished portion and fitting within said forwardly-projecting flange, said forwardly-projecting flange being crimped over the flange of said cap disk, a retainer-plate clampingly secured between the projecting flanges of said dished disks and provided with a yielding shackle-engaging prong extending in a direction away from said opening and provided with a projection adapted to prevent disengagement of the shackle from said prong, and a shackle provided with end-portions having perforations adapted to engage said prong.

2. A seal comprising a disk provided with a forwardly projecting flange having a cut-away portion, a retainer-disk fitting within said flange and having an extension projecting into said cut-away portion, said retainer-disk being provided with a shackle-engaging prong, means opposed thereto for preventing disengagement of the shackle, and a cap-disk bearing upon said retainer-disk and having an embossment affording an opening registering with the cut-away portion of said flange, said flange being crimped over the edge portion of said cap-disk.

3. A seal comprising a dished disk having an annular bearing surface encircling the dished portion of said disk and provided with a forwardly-projecting flange having a cut-away portion, a retainer-disk fitting within said flange and resting on said bearing and having a forward projection extending into said cut-away portion, said retainer-disk being provided with a rearwardly-extending yielding prong and being provided also with co-acting lugs adapted to prevent disengageemnt of the shackle, a dished cap having a flange portion bearing on said retainer-disk and having an embossment affording an opening registering with the recessed portion of said first-named flange, said first-named flange being crimped over the flange-portion of said cap-disk, and a shackle having end portions adapted to extend through said opening and having perforations adapted to engage said prong.

HARRY R. ROGERS.